United States Patent
De La Cerda et al.

(10) Patent No.: US 11,698,858 B2
(45) Date of Patent: Jul. 11, 2023

(54) PREDICTION BASED GARBAGE COLLECTION

(71) Applicant: Micron Technology, Inc., Boise, ID (US)

(72) Inventors: Joseph A. De La Cerda, Boise, ID (US); Bruce J. Ford, Meridian, ID (US); Benjamin Rivera, Boise, ID (US); Nicolas Soberanes, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 133 days.

(21) Appl. No.: 17/406,896

(22) Filed: Aug. 19, 2021

(65) Prior Publication Data

US 2023/0057577 A1 Feb. 23, 2023

(51) Int. Cl.
*G06F 3/06* (2006.01)
*G06F 12/02* (2006.01)
*G06N 3/04* (2023.01)
*G06F 18/214* (2023.01)

(52) U.S. Cl.
CPC ........ *G06F 12/0253* (2013.01); *G06F 3/0604* (2013.01); *G06F 3/0659* (2013.01); *G06F 3/0679* (2013.01); *G06F 12/0246* (2013.01); *G06F 18/214* (2023.01); *G06N 3/04* (2013.01)

(58) Field of Classification Search
CPC .... G06F 3/0604; G06F 3/0659; G06F 3/0679; G06F 12/0253; G06F 18/214; G06N 3/04
See application file for complete search history.

(56) References Cited

U.S. PATENT DOCUMENTS

| | | | |
|---|---|---|---|
| 8,572,411 B2 | 10/2013 | Ginter et al. | |
| 8,880,775 B2 | 11/2014 | Stefanus et al. | |
| 9,646,067 B2 | 5/2017 | Abercrombie et al. | |
| 10,043,035 B2 | 8/2018 | LaFever et al. | |
| 10,182,073 B2 | 1/2019 | Redlich et al. | |
| 10,976,962 B2 | 4/2021 | Karumbunathan et al. | |
| 2014/0344216 A1 | 11/2014 | Abercrombie et al. | |
| 2018/0330238 A1 | 11/2018 | Luciw et al. | |
| 2019/0260784 A1 | 8/2019 | Stockdale et al. | |
| 2020/0133898 A1* | 4/2020 | Therene | G06N 5/04 |
| 2021/0255799 A1* | 8/2021 | Kale | G06N 3/049 |
| 2021/0390045 A1* | 12/2021 | Merchant | G06F 12/0253 |

FOREIGN PATENT DOCUMENTS

JP 4008937 11/2007

* cited by examiner

*Primary Examiner* — Hiep T Nguyen
(74) *Attorney, Agent, or Firm* — Brooks, Cameron & Huebsch, PLLC (57) ABSTRACT

Apparatuses and methods can be related to performing prediction based garbage collection. Performing prediction based garbage collection can include performing a first instance of garbage collection, of the memory device, using a first circuitry of the controller and generating a prediction using a second circuitry of the controller. A confidence interval can also be generated for the prediction using the second circuitry of the controller. Responsive to determining that the confidence interval is greater than a threshold, a second instance of garbage collection, of the memory device, can be triggered using the first circuitry of the controller where the first instance of garbage collection is triggered before the second instance of garbage collection.

20 Claims, 5 Drawing Sheets

PREDICTION BASED GARBAGE COLLECTION

TECHNICAL FIELD

The present disclosure relates generally to memory, and more particularly to apparatuses and methods associated with performing prediction based garbage collection.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications including, but not limited to, personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

The present disclosure includes apparatuses and methods related to performing prediction based garbage collection. Garbage collection is a form of automatic memory management. Garbage collection reclaims memory occupied by objects that are no longer in use. Reclaiming memory, utilizing garbage collection, allows for the reclaimed memory to be available to store additional data whereas the memory prior to being reclaimed is not available to store additional data.

Garbage collection can free programs from performing memory deallocation. Garbage collection can be performed to eliminate dangling pointers and memory leaks, among other examples of problems associated with deallocating memory.

Garbage collection events can be triggered by a host and/or managed by the memory device (e.g., as background operations). For example, a memory device may wait for a specific idle condition to run a single garbage collection event. In various prior approaches, a duration of idle time as well as a length of time allocated for a garbage collection event (e.g., the garbage collection window) can be defined by static values. If further garbage collection is required after the garbage collection event is performed, then additional garbage collection events can be performed during subsequent idle events.

However, performing garbage collection based on a particular idle time duration and/or on a particular garbage collection window can have various drawbacks. The particular idle time duration and/or the particular garbage collection window can be static values in that they do not change. Particular device usages (e.g., types of write/read patterns, idle event types, etc.) may provide the ability to perform more or fewer garbage collection events during a particular idle event, which can improve system performance as compared to approaches in which garbage collection events and/or idle events are treated equally via static values. For instance, some idle events may allow sufficient time for multiple garbage collection events despite the garbage collection firmware algorithm allowing for only one garbage collection event per idle time event window. Conversely, some host sequences can lead to interruption of an executing garbage collection event, in which case it can be desirable to avoid such garbage collection events (or provide a smaller garbage collection window) in such instances in order avoid negative impact on system performance.

Additionally, there are instances in which a particular garbage collection event may complete prior to expiration of a static wait time. In such instances, it can be beneficial to allow other background operations to commence prior to expiration of the static wait time (e.g., upon completion of the garbage collection event) in order to allow other background operations to commence sooner.

Aspects of the present disclosure address the above and other deficiencies. In a number of embodiments, controller implemented machine learning is utilized to predict ideal garbage collection triggers and garbage collection event durations based on a known usage of a memory device and/or a system. A plurality of commands received by a controller of the memory device can be utilized to train an artificial neural network (ANN) to recognize customized garbage collection opportunities. The firmware of the memory device can generate customized timing profiles defining trigger events and durations of time that can be deployed once a predetermined confidence interval of a prediction of the artificial network is achieved for a given pattern of commands. Until customized timing profiles are identified, the firmware can use static time values.

As used herein, garbage collection events can include operations performed on a memory device to perform garbage collection. Artificial intelligence (AI) refers to the ability to improve a machine through "learning" such as by storing patterns and/or examples which can be utilized to take actions at a later time. Machine learning refers to a device's ability to learn from data provided as examples. Machine learning can be a subset of AI. As used herein, the ANN can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. An ANN can utilize a number of inputs to generate a prediction and a confidence interval of the prediction. A confidence interval defines a confidence of said prediction.

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. Analogous elements within a Figure may be referenced with a hyphen and extra numeral or letter. See, for example, elements 232-1, . . . , 232-N in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
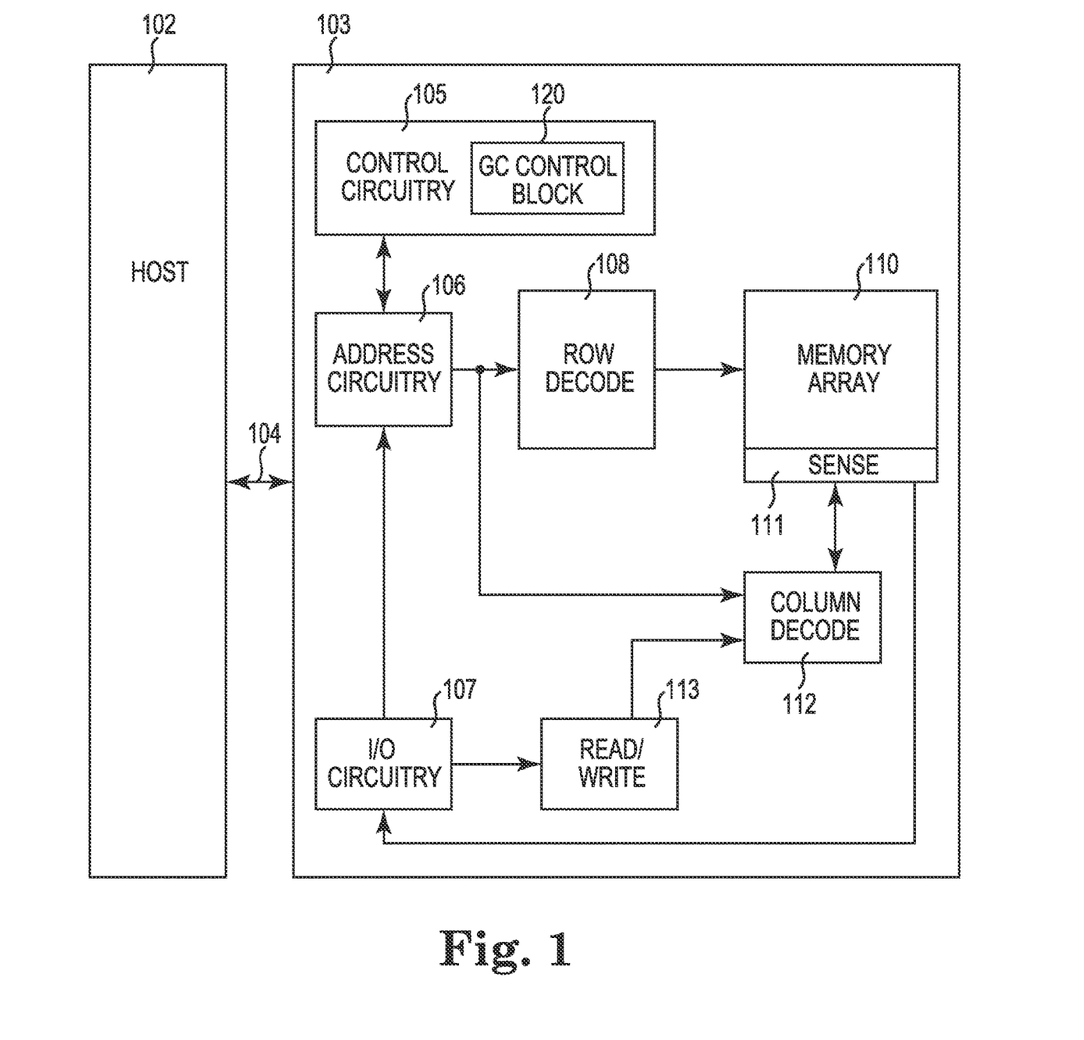
FIG. 1 is a block diagram of an apparatus in the form of a computing system including a memory device in accordance with a number of embodiments of the present disclosure.

FIG. 1 is a block diagram of an apparatus in the form of a computing system 100 including a memory device 103 in accordance with a number of embodiments of the present disclosure. As used herein, a memory device 103, memory array 110, and/or a host 102, for example, might also be separately considered an "apparatus."

In this example, the computing system 100 includes a host 102 coupled to memory device 103 via an interface 104. The computing system 100 can be a personal laptop computer, a desktop computer, a digital camera, a mobile telephone, a memory card reader, or an Internet-of-Things (IoT) enabled device, among various other types of systems. Host 102 can include a number of processing resources (e.g., one or more processors, microprocessors, or some other type of controlling circuitry), referred to as processors 116, capable of accessing the memory device 103. The computing system 100 can include separate integrated circuits, or both the host 102 and the memory device 103 can be on the same integrated circuit. For example, the host 102 may be a system controller of a memory system comprising multiple memory devices 103, with the system controller providing access to the respective memory devices 103 by another processing resource such as a central processing unit (CPU). As an example, the memory device 103 can be a managed NAND (mNAND) device.

In the example shown in FIG. 1, the host 102 is responsible for executing an operating system (OS) and/or various applications that can be loaded thereto (e.g., from memory device 103 via control circuitry 105). The OS and/or various applications can be loaded from the memory device 103 by providing access commands from the host 102 to the memory device 103 to access the data comprising the OS and/or the various applications. The host 102 can also access data utilized by the OS and/or various applications by providing access commands to the memory device 103 to retrieve said data utilized in the execution of the OS and/or the various applications.

For clarity, the computing system 100 has been simplified to focus on features with particular relevance to the present disclosure. The memory array 110 can be a DRAM array, SRAM array, STT RAM array, PCRAM array, TRAM array, RRAM array, NAND flash array, NOR flash array, and/or 3D Cross-point array for instance. The memory array 110 can comprise memory cells arranged in rows coupled by access lines (which may be referred to herein as word lines or select lines) and columns coupled by sense lines (which may be referred to herein as digit lines or data lines). Although the memory array 110 is shown as a single memory array, the memory array 110 can represent a plurality of memory arrays (e.g., arranged in banks of the memory device 103).

The memory device 103 includes address circuitry 106 to latch address signals provided over an interface 104. The interface can include, for example, a physical interface (e.g., a data bus, an address bus, and a command bus, or a combined data/address/command bus) employing a suitable protocol. Such protocol may be custom or proprietary, or the interface 104 may employ a standardized protocol, such as Peripheral Component Interconnect Express (PCIe), Gen-Z interconnect, cache coherent interconnect for accelerators (CCIX), or the like. Address signals are received and decoded by a row decoder 108 and a column decoder 112 to access the memory arrays 110. Data can be read from memory arrays 110 by sensing voltage and/or current changes on the sense lines using sensing circuitry 111. The sensing circuitry 111 can be coupled to the memory arrays 110. Each memory array and corresponding sensing circuitry can constitute a bank of the memory device 103. The sensing circuitry 111 can comprise, for example, sense amplifiers that can read and latch a page (e.g., row) of data from the memory array 110. The I/O circuitry 107 can be used for bi-directional data communication with the host 102 over the interface 104. The read/write circuitry 113 is used to write data to the memory arrays 110 or read data from the memory arrays 110. As an example, the circuitry 113 can comprise various drivers, latch circuitry, etc.

Control circuitry 105 decodes signals provided by the host 102. The signals can be commands provided by the host 102. These signals can include chip enable signals, write enable signals, and address latch signals that are used to control operations performed on the memory array 110, including data read operations, data write operations, and data erase operations. The signals can also include commands to place the memory device 103 in an idle state. For example, the commands can include a hibernate command. The signals can also include commands to interrupt garbage collection events. In various embodiments, the control circuitry 105 is responsible for executing instructions from the host 102. The control circuitry 105 can comprise a state machine, a sequencer, and/or some other type of control circuitry, which may be implemented in the form of hardware, firmware, or software, or any combination of the three. In some examples, the host 102 can be a controller external to the memory device 103. For example, the host 102 can be a memory controller which is coupled to a processing resource of a computing device. Data can be provided to the memory array 110 and/or from the memory array via the data lines coupling the memory array 110 to the I/O circuitry 107.

The control circuitry 105 can include garbage collection block 120. The garbage collection block 120 can include hardware (e.g., logic) and/or firmware which can be utilized to trigger garbage collection events. As used herein, triggering events can include providing signals which are utilized to initiate and/or execute operations. As such, triggering garbage collection events can include providing signals which cause the initialization and/or execution of operations associated with garbage collection.

The garbage collection block 120 can include circuitry and/or firmware to trigger garbage collection events based on static values. The static values can include static criteria such a static duration of time among other possible static values. For example, the circuitry and/or the firmware can utilize a static duration of time to trigger garbage collection events and/or to generate a duration of time in which the garbage collection events and/or associated operations are executed.

The garbage collection block 120 can include separate circuitry and/or firmware to utilize an ANN to trigger the garbage collection and/or generate a duration of time in which the garbage collection events and/or associated operations are executed. The triggering of the garbage collection and/or the duration of time in which the garbage collection events and/or associated operations are executed can be dynamic such that they differ based on a training of the ANN. Triggering garbage collection events dynamically can allow for longer bursts of garbage collection based on a usage of a memory device without negatively impacting performance of the memory device and/or the system. Triggering garbage collection events dynamically can also allow for the triggering of the garbage collection events prior to the identification of idle events of the memory device. Additionally, providing dynamic garbage collection windows can allow background operations to be accomplished sooner. For example, if a garbage collection event completes prior to expiration of a static window, it is beneficial to reduce the garbage collection window in order to allow the other background operation to execute sooner.

Figure 2:
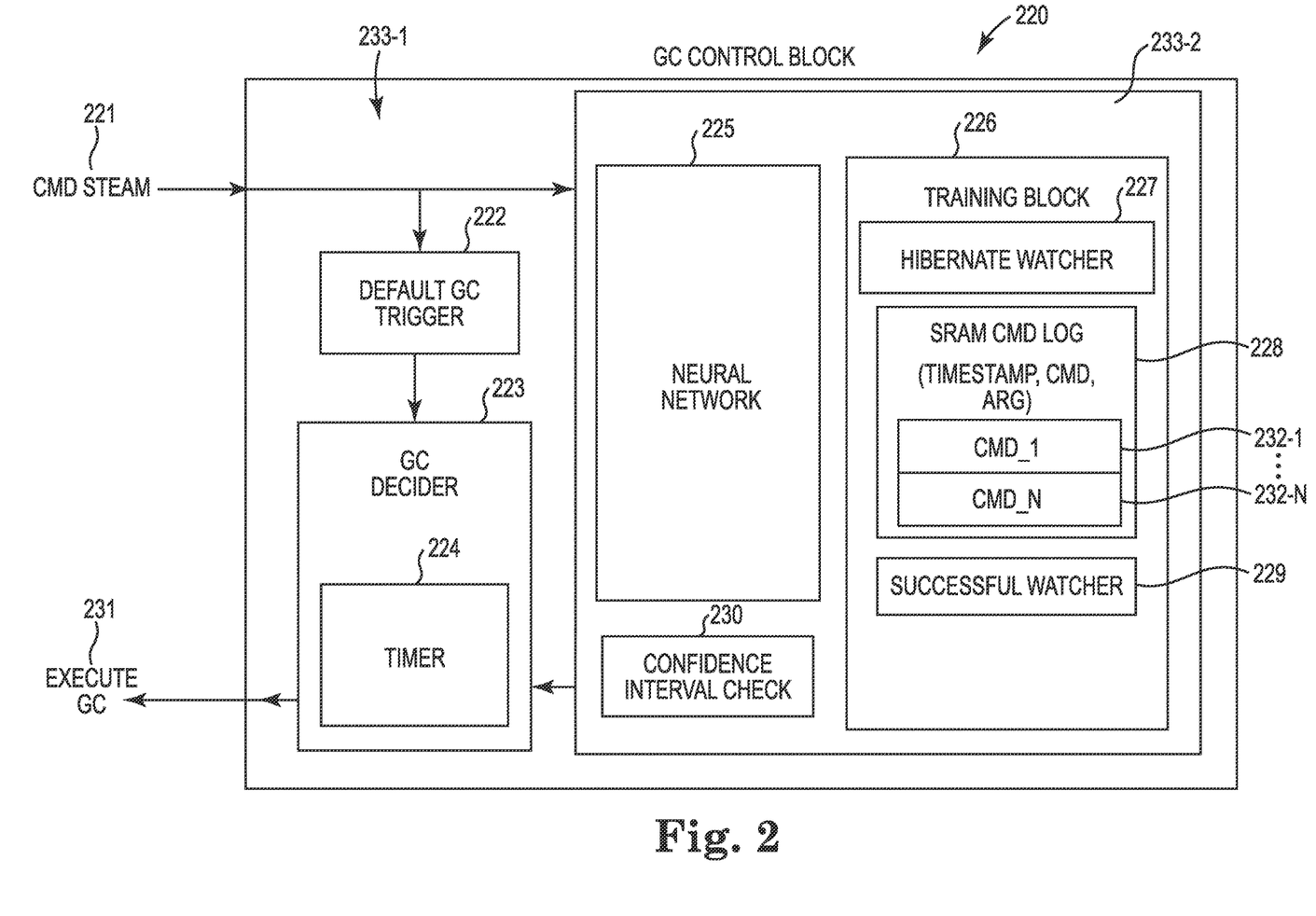
FIG. 2 illustrates a block diagram of a garbage collection control block in accordance with a number of embodiments of the present disclosure.

FIG. 2 illustrates a block diagram of a garbage collection control block 220 in accordance with a number of embodiments of the present disclosure. The garbage collection control block 220 can receive a command stream 221. The garbage collection control block 220 can provide signals 231 which trigger garbage collection events. The garbage collection control block 220 can comprise more than one circuitry/firmware to implement different triggering mechanisms. For example, the garbage collection control block 220 can comprise a circuitry 233-1 and a circuitry 233-2 to provide for different triggerings of the garbage collection based on static values or based on the command stream 221 which can comprise the dynamic values, among other possible dynamic values. Although circuitry 233-1. 233-2 are described as hardware, the circuitry 233-1 233-2 can be implemented as firmware. For example, a same hardware can be used to implement a first portion of firmware and a second portion of firmware.

The circuitry 233-1 can comprise block 222, block 223, and timer 224. The circuitry 233-2 can comprise an ANN 225, a block 226, and a confidence interval check 230. The block 226 (training block) can comprise block 227, a ring buffer 228, and block 229.

The circuitry 233-1 can trigger garbage collection based on static values. For instance, the block 222 of the circuitry 233-1 can monitor the command stream 221 and can identify commands that trigger idle conditions of the memory device. Commands that trigger idle conditions can include, for example, hibernate commands, among other commands that can trigger idle conditions.

The block 222 can provide a signal to the block 223. The block 223 can be hardware or firmware and responsive to receipt of the signal from the block 222 can generate a duration for which the garbage collection events are performed. The timer 224 can be used to generate and/or store a static value including a duration of time for which the garbage collection events are performed. The timer 224 can be a register which stores a static value which can be used to generate a duration of time (e.g., window) for which the garbage collection events are performed.

The block 223 (GC Decider) can also receive a duration of time from the circuitry 233-2. The block 223 can trigger garbage collection events based on the duration of time received from the circuitry 233-2 if such a duration of time is received or the block 223 can trigger garbage collection events based on the duration of time generated using the timer 224, the signal received from the block 222, and if not duration of time is received from the circuitry 233-2. As such, the block 223 can be described as a triggering mechanism. The block 223 is described as a triggering mechanism because the block 223 provides a signal that causes a garbage collection event to be executed. As previously described, the block 223 can comprise hardware and/or firmware.

The commands from the command stream 221 can also be provided to the circuitry 233-2 (e.g., AI circuitry). For example, the commands can be received at the block 226 and/or the ANN 225. The block 226 (training block) of the circuitry 233-2 is firmware and/or software that can utilize the commands from the command stream 221 to train the ANN 225. The ANN 225 can utilize the commands from the command stream 221 to generate a duration of time for performing garbage collection events and a confidence interval. Although the examples in FIG. 2 are provided using the ANN 225, other types of circuitry and/or firmware can be used to implement AI to generate a duration of time and a confidence interval. In various examples, the ANN 225 can generate the duration of time for performing garbage collection events, a different duration of time or a time for starting the performance of garbage collection, and the confidence interval. The duration of time or the time for starting the performance of garbage collection can indicate a time in the future in which the block 223 triggers the performance of garbage collection. The duration of time for starting the performance of garbage collection identified a duration of time between the output of the ANN 225 and the time in which the performance of garbage collection is triggered.

The block 226 can store the commands 232-1, . . . , 232-N in a ring buffer 228. The commands 232-1, . . . , 232-N can be referred to as commands 232. The ring buffer 228 is hardware and/or firmware that can log commands using SRAM or other suitable memory. As such, the ring buffer 228 can also be referred to as a SRAM command (CMD) log. The ring buffer 228 can also be referred to as a circular buffer of simply buffer. The buffer 228 can store the commands, a time stamp for each of the commands 232, and/or arguments for the commands 232 individually or collectively.

The block 226 can determine whether any given command from the command stream 221 places the memory device in an idle state. For example, the block 227 from the block 226 is hardware and/or firmware that can determine whether any given command is a hibernate command or a different specific command that places the memory device in an idle state. Hibernate commands can also be utilized to train the ANN 225. For example, the hibernate commands can trigger a training of the ANN 225. The ANN 225 can learn that if a particular plurality of commands (e.g., sequence of commands) from the command stream 221 and which are stored in the buffer 228 are received, then a hibernate commands is expected within a window of time. A time at which the hibernate command is received can also be used to determine whether the ANN's prediction was accurate. The ANN 225 can be trained based on said consideration. The commands 232, the time stamps, and/or the arguments can be provided to the ANN 225 for training as input or can be used to judge the output of the ANN 225.

The block 226 can also include block 229 which can determine whether garbage collection events were successfully executed. The block 229 is hardware and/or firmware that can be referred to as a successful watcher block. As described herein, executing garbage collection events can describe the executing of the operations corresponding to the garbage collection events. The garbage collection events can be executed successfully if the execution of the garbage collection events is not interrupted. The host can provide commands to interrupt the garbage collection events by placing the memory device in an active state after the memory device has been placed in an idle state or by providing any commands other than commands that place the memory device in an idle state after the memory device has been placed in an idle state. The block 229 can identify commands that interrupt the garbage collection events. The block 229 can also store said identification utilizing a register, for example.

If the garbage collection events are executed successfully (e.g., to completion without being interrupted), then an indication of a successful completion of the garbage collection events can be stored by the block 229. The indication of a successful completion can be used to train the ANN 225. For instance, if the block 229 indicates that the garbage collection events were executed to completion, then the ANN 225 can be trained with said indication by fortifying, in the ANN 225 using the weights and the biases, that a correct duration of time was generated for the execution of the garbage collection events. The block 229 can also indicate that the garbage collection events were not executed to completion. The ANN 225 can also be trained, by updating the weights and biases, with said indication by identifying that the duration of time that was generated for the execution of the garbage collection event was not appropriate.

The commands 232 can be provided to the ANN 225 for training. The commands 232, the time stamps, and the arguments can represent a usage of the memory device. The ANN 225 can generate a timing profile based on the usage of the memory device utilizing the commands 232. Although the ANN 225 is utilized in the examples described herein, the particular AI implementation is not limited to an ANN 225 but can include different machine learning systems which can be utilized to create a duration of time and a confidence interval.

A usage of the memory device can describe how the memory device or how a system is used. For example, a computing system used primarily for data processing will exhibit different usage patterns compared to a computing system used to stream video or used to play video games, for example. A usage of a system can influence the usage of the memory device and the commands 232 that the garbage collection block 220 receives, the timestamps, and/or the arguments.

A timing profile can include trigger events and durations of time for executing the garbage collection events. The timing profile can be integrated in the ANN 225. For example, the ANN can include weight and bias values that can represent timing profiles. The trigger events identified by the ANN 225 can be dynamic values which can differ from static values utilized by the circuitry 233-1. The trigger events can include a hibernate command and/or can include different commands that precede the hibernate command or follow the hibernate command. For instance, in a particular usage a particular number of commands can be received prior to receiving the hibernate commands. The ANN 225 can learn said sequence of commands and can trigger the garbage collection events responsive to identifying the sequence of commands even if a hibernate command has not been identified at the time of the triggering of the garbage collection events. As such, the ANN 225 can learn that said hibernate command is expected and can trigger the garbage collection events with a longer duration of time for the execution of the garbage collection events as compared to a triggering of the garbage collection events generated by the circuitry 233-1.

The confidence interval check 230 is hardware and/or firmware that can determine whether a confidence interval generated by the ANN 225 is greater than a threshold. If the confidence interval is greater than the threshold, then the ANN 225 is sufficiently confident in the duration of time for the execution of the garbage collection events and a starting time of the triggering of the garbage collection events, to warrant said triggering. The confidence interval check 230 can provide a signal to the block 223 which can be used to determine whether to trigger the garbage collection events and/or for how long to trigger the garbage collection events. The garbage control block 220 can generate the signal 231 to execute the garbage collection based on the results determined by the circuitry 233-1 and the circuitry 233-2. For instance, the duration of time and the triggering of the garbage collection events generated by the ANN 225 can be utilized over the triggering and the duration of time generated by the circuitry 233-1 if the confidence interval generated by the ANN 225 is greater than a threshold. In various examples, the block 223 can utilize a duration of time and/or a time, for triggering the garbage collection events, provided by the ANN 225 to determine when to trigger the garbage collection events.

Figure 3:
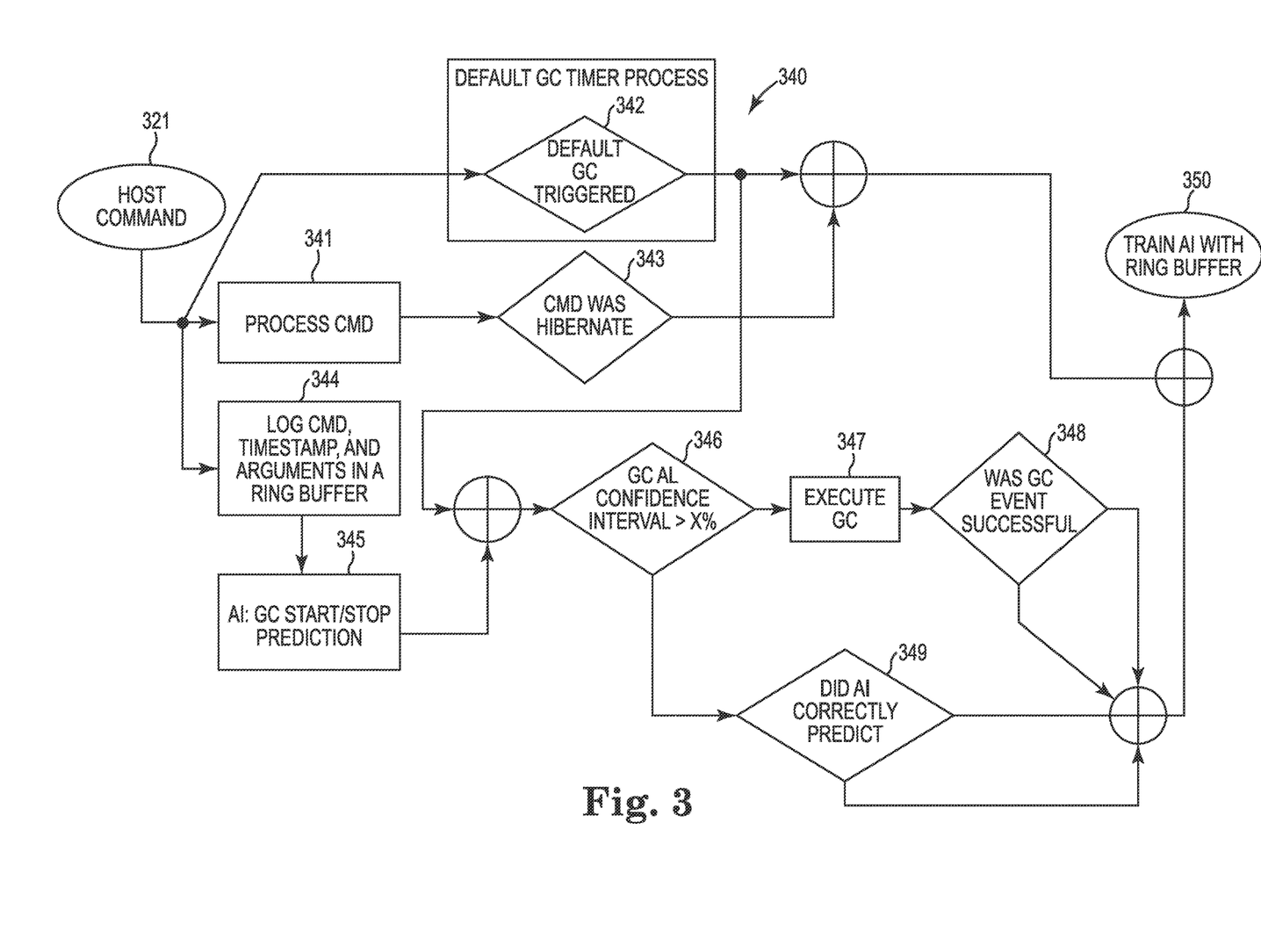
FIG. 3 illustrates an example flow diagram for artificial neural network training for garbage collection in accordance with a number of embodiments of the present disclosure.

FIG. 3 illustrates an example flow diagram 340 for artificial neural network training for garbage collection in accordance with a number of embodiments of the present disclosure. At 321, a host can provide a number of commands which may constitute a command stream. The host can provide the commands to a memory device. At 342, a determination can be made as to whether a default garbage collection was triggered responsive to the commands. A default garbage collection can reference the triggering of garbage collection events utilizing static values as described above. For example, the default garbage collection can be triggered using the circuitry 233-1 and the timer 224. The determination of whether a default garbage collection was triggered responsive to the command can be part of default garbage collection timer.

At 341, the command can be processed. Responsive to processing the commands and at 343, a determination can be made as to whether the command was a hibernate command. If the command was a hibernate command, then the ANN can be trained utilizing the ring buffer at 350. For example, the hibernate command can indicate that training of the ANN can take place in background operations. At 342, a determination can be made as to whether the circuitry 233-1 of FIG. 2 indicates that the block 223 can trigger garbage collection utilizing the timer 224. The triggering of the garbage collection at 342 and the determination that the command was a hibernate command can be utilized at 350 to train an ANN utilizing a ring buffer.

At 344, the commands received from the host 321 can also be logged. For instance, a command, a time stamp corresponding to the command, and arguments corresponding to the command can be stored in a ring buffer. At 345 and responsive to logging the command, the time stamp, and the arguments, the ANN can generate a start and stop prediction which was previously described as a duration of time for executing the garbage collection events. The predication can be described as a start and stop prediction because the ANN can generate a prediction of when to start execution of the garbage collection events and when to stop execution of the garbage collection events. The stop and start prediction can also be referred to as a prediction given that ANN is predicting that the garbage collection events can be executed without interruption if started as a start time and stopped at a stop time.

The start and stop prediction, generated at 345, and the determination, made at 342, of whether the circuitry 233-1 of FIG. 2 indicates that the block 223 can trigger garbage collection utilizing the timer 224 can be utilized at 346 to determine whether a garbage collection confidence interval is greater than a threshold. The determination of whether the confidence interval is greater than a threshold can be utilized at 347 to determine whether to trigger the execution of the garbage collection events using the start and stop predictions generated at 345. The result of the execution of the garbage collection events can be used at 348 to determine whether the execution of the garbage collection events was successful. The execution of the garbage collection events is successful if the garbage collection events are executed without being interrupted. The determination of whether the garbage collection events were executed successfully can also be utilized at 350 to train the ANN.

The determination of whether the confidence interval is greater than a threshold can be utilized at 349 to determine if the ANN correctly predicted that the memory device would be placed in an idle state. The ANN can correctly predict that the memory device would be placed in an idle state if the hibernate command is received between the start time and the stop time predicted by the ANN. The determination made at 349 can be utilized at 350 to further train the ANN. For example, the output of 348 and 349 can be used to positively or negatively reinforce the ANN prediction. In various examples, the output of 342, 343, 348, and 349 can be used to positively or negatively reinforce the ANN prediction at 350. The outputs of 342, 343, 348, and 349 can include positive outputs or negative outputs. For example, the output of 349 can include a determination that AI correctly predicted or did not correctly predict.

Figure 4:
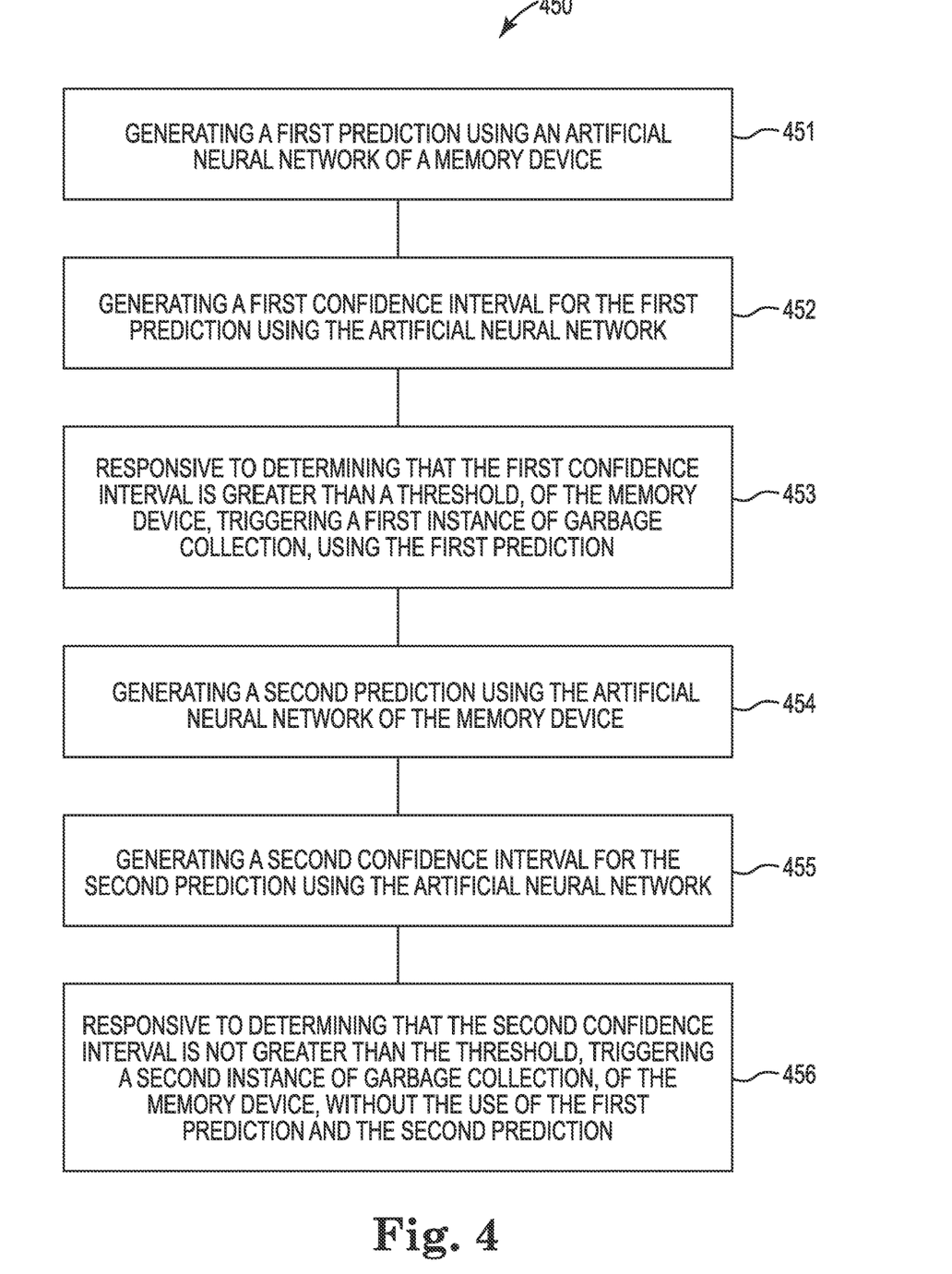
FIG. 4 illustrates an example flow diagram of a method for performing garbage collection in accordance with a number of embodiments of the present disclosure.

FIG. 4 illustrates an example flow diagram of a method 450 for performing garbage collection in accordance with a number of embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the control circuitry (e.g., controller) 105 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 451, a first prediction can be generated using an artificial neural network of a memory device. At 452 a first confidence interval can be generated for the first prediction using the artificial neural network. The artificial neural network can generate both the first prediction and the first confidence interval as a same time.

At 453 and responsive to determining that the first confidence interval is greater than a threshold, a first instance of garbage collection, of the memory device, can be triggered using the first prediction. The first prediction can be used to when a start time for triggering the garbage collection and a time to conclude the garbage collection.

At 454, a second prediction can be generated using the artificial neural network. At 455, a second confidence interval can be generated for the second prediction using the artificial neural network.

At 456, responsive to determining that the first confidence interval is not greater than the threshold, a second instance of garbage collection, of the memory device, can be triggered without a use of the first prediction and the second prediction. A usage of a system or the memory device can change between the time the first prediction was generated and the time the second prediction was generated. Given that a usage changed the ANN can be less confident in the second prediction as compared to the first prediction. Given that the ANN is less confident in the second prediction, the controller can be used to trigger the garbage collection.

In various instances, a first plurality of commands can be received at the controller of the memory device. The first plurality of commands can define a first usage of the memory device. The network can be trained using the first plurality of commands where the trained network is used to generate the first prediction and the first confidence.

A second plurality of commands can also be received at the controller of the memory device. The second plurality of commands can define a second usage of the memory device. The artificial neural network can be trained using the second plurality of commands where the trained artificial neural network is used to generate the second prediction and the first prediction.

In a number of examples, the network can be trained using a plurality of commands, a corresponding plurality of time stamps, and/or arguments corresponding to the plurality of commands. The commands, the time stamps, and/or the arguments can further be used to define a usage of the memory device.

A command that interrupts the first instance of garbage collection can be received by the memory device and from the host. The network can be trained using the command, the plurality of commands, the corresponding plurality of time stamps, and the arguments corresponding to the plurality of commands. For instance, the interruption of the execution of the garbage collection can be utilized by the memory device to train the artificial neural network. A correction can be made to the artificial neural network such that in future instances the duration of time the garbage collection is carried out is shorter than a previous duration of time.

In various examples, a controller coupled to a memory device can trigger a first instance of garbage collection, of the memory device, using the controller. The controller can also generate a prediction using the artificial neural network of the controller. A confidence interval can be generated for the prediction using the artificial neural network. Responsive to determining that the confidence interval is greater than a threshold, a second instance of garbage collection, of the memory device, can be triggered using the controller wherein the first instance of garbage collection is triggered before the second instance of garbage collection. As used herein, the controller can trigger the garbage collection by providing a signal.

The controller can further be configured to, responsive to determining that the confidence interval is greater than the threshold, trigger the second instance of garbage collection utilizing the prediction. Responsive to determining that the confidence interval is greater than the threshold, the second instance of garbage collection can be triggered after a duration of time equal to the prediction has passed.

The first instance of the garbage collection can be triggered based on a number of static values. The static values can include a duration of idle time and/or a duration of time of the first instance of the garbage collection. For example, the static value can describe a generic duration of the garbage collection and/or a start time of the garbage collection. A usage of the memory device can be modeled using an ANN, for example.

In various instances, a controller coupled to the memory device can be configured to receive a command stream comprising a plurality of commands, where the command stream is received at the controller and wherein the first circuitry is utilized to trigger a garbage collection of the memory device. A predetermined command can be identified from the command stream at the controller. Responsive to identifying the predetermined command, a network can be trained utilizing the plurality of commands. The network can be utilized to trigger the garbage collection of the memory device. The plurality of commands can be stored in a ring buffer of the controller.

Figure 5:
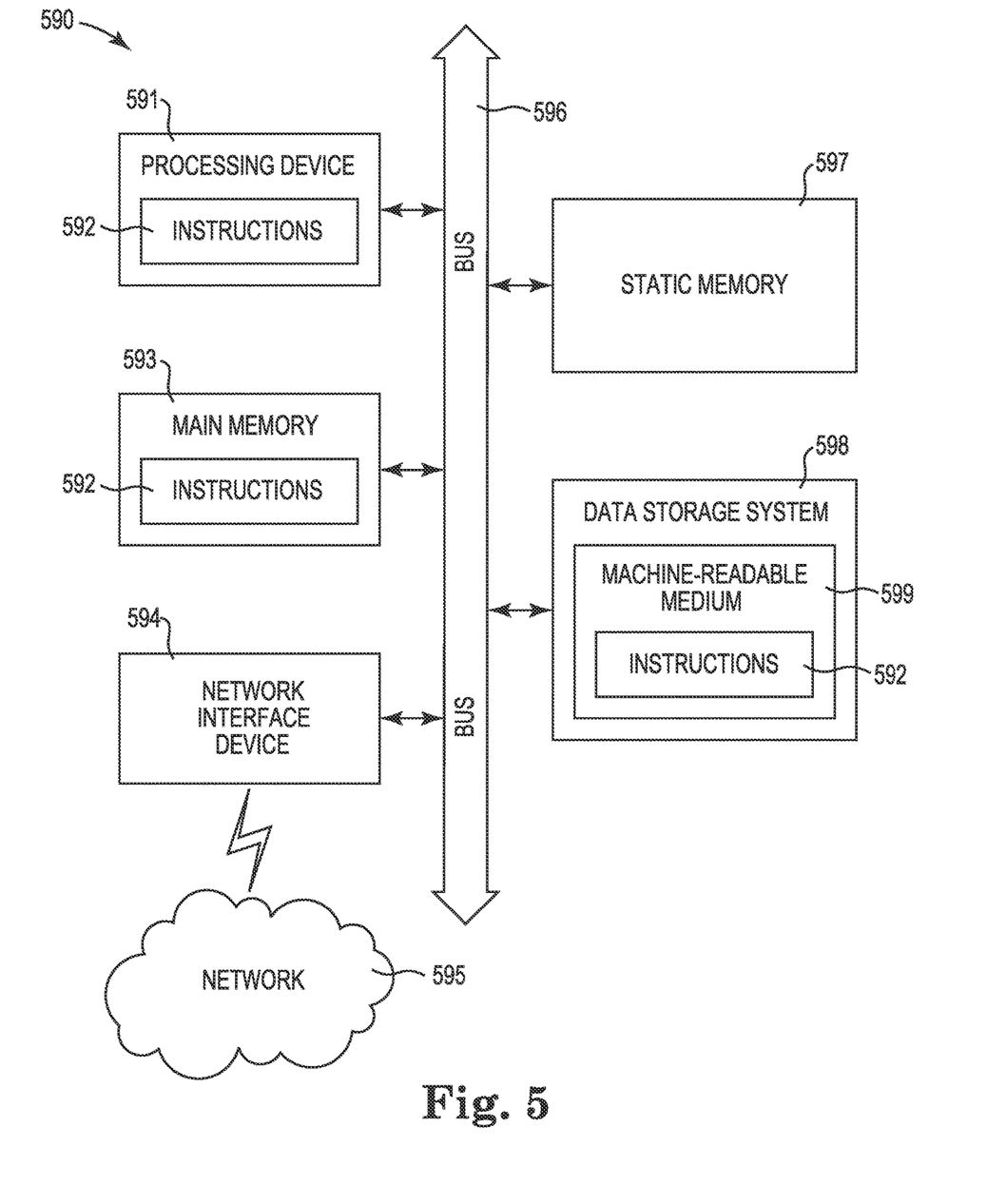
FIG. 5 illustrates an example computer system within which embodiments of the present disclosure can operate.

FIG. 5 illustrates an example computer system 590 within which embodiments of the present disclosure can operate. In various embodiments, the computer system 590 can correspond to a system (e.g., the computing system 100 of FIG. 1) that includes, is coupled to, or utilizes a memory sub-system (e.g., the memory device 103 of FIG. 1) or can be used to perform the operations of a controller (e.g., the controller circuitry 105 of FIG. 1).

The system 590 can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine.

The example computer system 590 includes a processing device 591, a main memory 593 (e.g., read-only memory (ROM), flash memory, dynamic random access memory (DRAM) such as synchronous DRAM (SDRAM) or Rambus DRAM (RDRAM), etc.), a static memory 597 (e.g., flash memory, static random access memory (SRAM), etc.), and a data storage system 598, which communicate with each other via a bus 596.

Processing device 591 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 591 can also be one or more special-purpose processing devices such as an application specific integrated circuit (ASIC), a field programmable gate array (FPGA), a digital signal processor (DSP), network processor, or the like. The processing device 591 is configured to execute instructions 592 for performing the operations and steps discussed herein. The computer system 590 can further include a network interface device 594 to communicate over the network 595.

The data storage system 598 can include a machine-readable storage medium 599 (also known as a computer-readable medium) on which is stored one or more sets of instructions 592 or software embodying any one or more of the methodologies or functions described herein. The instructions 592 can also reside, completely or at least partially, within the main memory 593 and/or within the processing device 591 during execution thereof by the computer system 590, the main memory 593 and the processing device 591 also constituting machine-readable storage media.

In one embodiment, the instructions 592 include instructions to implement functionality corresponding to the host 102 and/or the memory device 103 of FIG. 1. While the machine-readable storage medium 599 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus comprising:
a memory device;
a controller coupled to the memory device and configured to:
  trigger a first instance of garbage collection, of the memory device, based on static values;
  generate a prediction of a second instance of garbage collection;
  generate a confidence interval for the prediction; and
  responsive to determining that the confidence interval is greater than a threshold, trigger the second instance of garbage collection based on the prediction wherein the first instance of garbage collection is triggered before the second instance of garbage collection.

2. The apparatus of claim 1, wherein the controller is further configured to, responsive to determining that the confidence interval is greater than the threshold, trigger the second instance of garbage collection utilizing a same trigger mechanism as is used to trigger the first instance of garbage collection.

3. The apparatus of claim 1, wherein the controller is further configured to, responsive to determining that the confidence interval is greater than the threshold, trigger the second instance of garbage collection after a duration of time equal to the prediction has passed.

4. The apparatus of claim 1, wherein the static values describe a duration of idle time in which to perform the first instance of the garbage collection.

5. The apparatus of claim 4, wherein the static values describe a duration of time of the first instance of the garbage collection.

6. The apparatus of claim 1, wherein the controller further comprises an artificial neural network configured to generate the prediction and the confidence interval.

7. The apparatus of claim 6, wherein the first instance of garbage collection is triggered without use of the artificial neural network.

8. The apparatus of claim 6, wherein the controller is further configured to model a usage of the memory device using the artificial neural network.

9. A method, comprising:
generating a first prediction using an artificial neural network of a memory device;
generating a first confidence interval for the first prediction using the artificial neural network;
responsive to determining that the first confidence interval is greater than a threshold of the memory device, triggering a first instance of garbage collection using the first prediction;
generating a second prediction using the artificial neural network of the memory device;
generating a second confidence interval for the second prediction using the artificial neural network; and
responsive to determining that the second confidence interval is not greater than the threshold, triggering a second instance of garbage collection, of the memory device, without the use of the first prediction and the second prediction.

10. The method of claim 9, further comprising receiving a first plurality of commands at the controller of the memory device, wherein the first plurality of commands define a first usage of the memory device.

11. The method of claim 10, further comprising training the artificial neural network using the first plurality of commands wherein the trained artificial neural network is used to generate the first prediction and the first confidence.

12. The method of claim 10, further comprising receiving a second plurality of commands at the controller of the memory device, wherein the second plurality of commands define a second usage of the memory device.

13. The method of claim 12, further comprising training the artificial neural network using the second plurality of commands where the trained artificial neural network is used to generate the second prediction and the first prediction.

14. The method of claim 9, further comprising training the artificial neural network using a plurality of commands, a corresponding plurality of time stamps, and a plurality of arguments corresponding to the plurality of commands.

15. The method of claim 9, further comprising:
receiving a command that interrupts the first instance of garbage collection; and
training the artificial neural network using the command, the plurality of commands, the corresponding plurality of time stamps, and a plurality of arguments corresponding to the plurality of commands.

16. An apparatus, comprising:
a memory device;
a controller coupled to the memory device and configured to:
  receive a command stream comprising a plurality of commands, wherein the command stream is received at the controller and wherein the controller is utilized to trigger a garbage collection of the memory device;
  identify a predetermined command from the command stream; and
  responsive to identifying the predetermined command, train an artificial neural network implemented in the controller utilizing the plurality of commands, wherein the artificial neural network is utilized to trigger the garbage collection of the memory device.

17. The apparatus of claim 16, wherein the controller is further configured to store the plurality of commands in a ring buffer.

18. The apparatus of claim 16, wherein the predetermined command is a hibernate command.

19. The apparatus of claim 16, wherein the controller is further configured to:
generate a prediction utilizing the artificial neural network;
determine whether a confidence interval of the prediction is greater than a threshold;
responsive to determining that the confidence interval is greater than the threshold, trigger a garbage collection of the memory device;
store a determination of whether the garbage collection was performed successfully;
train the artificial neural network utilizing the plurality of commands and the determination of whether the garbage collection was performed successfully.

20. The apparatus of claim 16, wherein the controller is further configured to:
- generate a prediction utilizing the artificial neural network that the predetermined command is to be received;
- receive an additional plurality of commands;
- determine whether the prediction was correct based on whether the additional plurality of commands included the predetermined command;
- train the artificial neural network utilizing the plurality of commands and the determination of whether the predetermined command was included in the additional plurality of commands.

* * * * *